June 22, 1954 — J. C. MILLER — 2,681,680
NONSKID TIRE
Filed Oct. 15, 1949
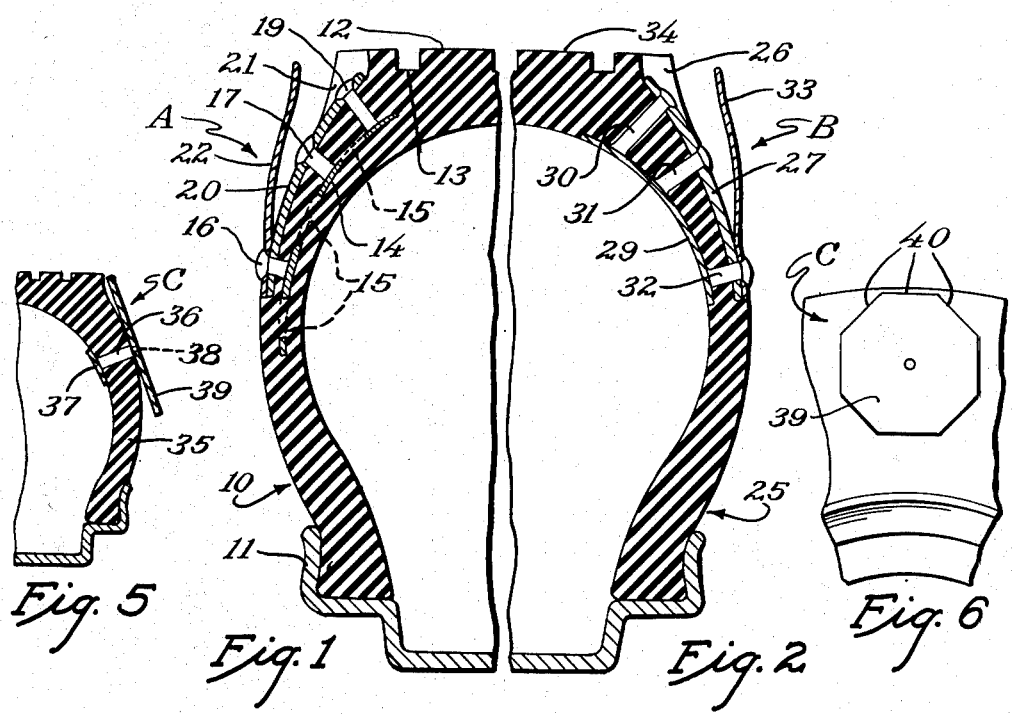
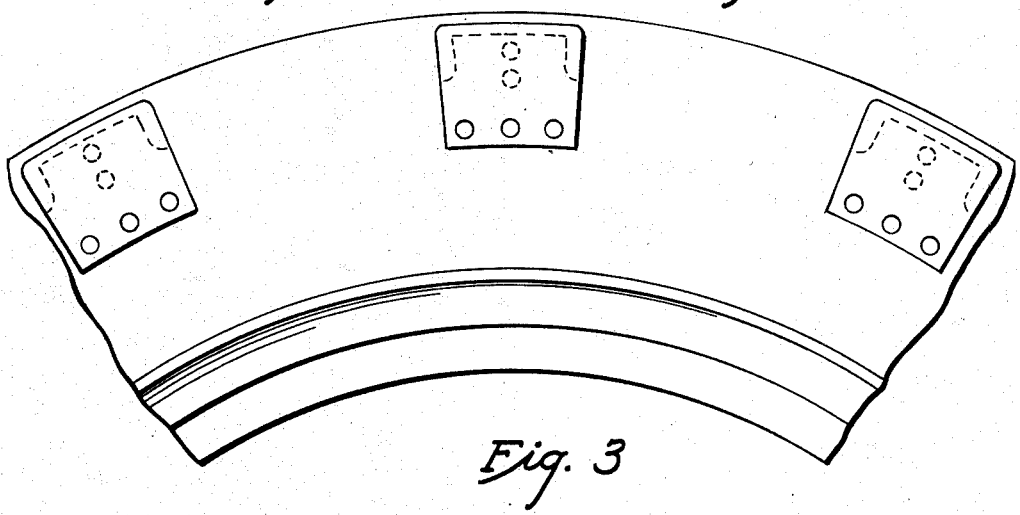
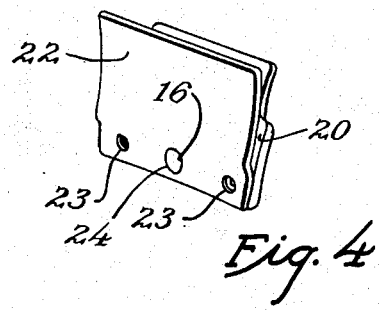
Inventor
Joseph C. Miller
By Robert M. Dunning
ATTORNEY Patented June 22, 1954

2,681,680

UNITED STATES PATENT OFFICE 2,681,680

NONSKID TIRE

Joseph C. Miller, St. Paul, Minn., assignor to Wilbur Miller, Minneapolis, Minn.

Application October 15, 1949, Serial No. 121,543

3 Claims. (Cl. 152—208)

My invention relates to an improvement in nonskid tire wherein it is desired to provide a tire which will not slide laterally. The tire is designed for use on cars, trucks, buses, and the like.

It is common practice to apply to a vehicle tire some type of anti-skid means to prevent the skidding of the tires, particularly in wet or icy weather. Chains having a pair of side chains connected with cross connecting chains are often used for this purpose. Other types of devices which encircle the tire casing transversely of the wheel are often sometimes used. Such devices are usually better able to stop skidding movement of the car longitudinally of the direction of travel than transversely thereof. Furthermore, such devices usually must be applied to the tire during wet or slippery weather and detached at other times to avoid excessive wear.

An object of the present invention lies in the provision on the tire casing of angularly spaced means particularly designed to prevent lateral skidding of the tire. As a car skids laterally the tire is deflected to some extent in a lateral direction. This action brings into operation my angularly spaced spring blades which tend to limit further skidding movement.

A feature of the present invention lies in the provision on a vehicle tire of angularly spaced plates or blades which extend in a generally radial direction from the sides of the tire to a point spaced inwardly from the surface of the tire. These blades or plates are normally spaced from the road or highway but contact the road when the tire is deflected laterally. As a result the lateral skidding of the vehicle is considerably decreased.

An added feature of the present invention lies in the provision of a non-skid tire having generally radially extending blades in angularly spaced relation on both sides of the tire which are engageable with the road when the car skids in either direction. If the vehicle tends to skid in one direction the blades on one side of the tire tend to contact the road while skidding of the tire and deflection thereof in the opposite direction tend to bring the other set of blades into contact with the highway.

An added feature of the present invention lies in the fact that my device is applicable to a tire of generally common construction in which a pneumatic tube or other filler is in place within the casing, or may be applied to a tubeless tire which requires no inner tube. Regardless of the type of tire employed or of the means used for maintaining the tire in proper form, my plates may be used in conjunction therewith.

These and other objects and novel features of my invention will be more clearly and fully set forth in the following specification and claims.

In the drawings forming a part of my specification:

Figure 1 is a sectional view through a tire casing showing a manner in which the plates may be anchored to the tire casing.

Figure 2 is a sectional view similar to Figure 1 showing a slightly different form of anchoring the non-skid plates in place.

Figure 3 is a side elevation view of the tire showing the manner in which the non-skid blades or plates are secured thereto in spaced relation.

Figure 4 is a perspective view of a type of plate or blade construction.

Figure 5 is a sectional view showing a modified form of construction of non-skid plate.

Figure 6 is a side elevation view of the construction shown in Figure 5.

The construction A illustrated in Figure 1 of the drawings is shown in conjunction with a tire casing 10 which is generally of conventional shape and which is mounted upon a tire rim 11. The casing 10 is of any desired outside shape or form and is provided with an outer tread or surface 12 which is usually almost flat and which may be grooved as indicated at 13 so as to prevent slippage.

At angularly spaced points about the casing 10 I provide an anchoring plate 14 provided with apertures 15 therethrough so that the material forming the tire casing may embed the strip 14 without considerable loss of structural strength. The strip 14 is provided with integral shanks 16, 17, and 19 projecting therefrom in spaced relation. These shanks 16, 17, and 19 are designed to extend through suitable apertures in a bearing plate 20 arranged to overlie a portion of the surface of the casing 10.

In usual practice I prefer to provide notches such as 21 in angularly spaced relation about the casing 10 and to mount the bearing plates 20 in these notches 21. The notches 21 assist in holding the bearing plates 20 in proper position and the bearing plates 20 are usually curved to fit the curvature of the casing and to provide a firm bearing against the outside of the casing. The shanks 16, 17, and 19 extend through the bearing plate 20 and are provided with fastening means for fastening the bearing plate in spaced relation to the anchoring strip 14.

It will be noted that the shanks 17 and 19 extend through suitable spaced apertures in the bearing plate 20 and are riveted over so as to prevent separation between the plate 20 and the strip 14. As a result a portion of the casing is sandwiched between the strip 14 and the plate 20 to firmly hold the bearing plate 20 in place.

A spring blade or plate 22 overlies the bearing plate 20 near the edge thereof most remote from the outer tire surface 12. Apertures such as 23 may extend through the spring plate 22 and through an edge of the bearing plate 20 and suitable means may be inserted therethrough to hold the parts in properly assembled relation. These openings 23 are in addition to the center openings 24 through which the shank 16 extends and the shank 16 when riveted over forms an additional means for holding the spring plate 22 and the bearing plate 20 in proper relation to the anchoring strip 14.

In Figure 2 of the drawings I disclose a modified form of construction B which is similar to the construction A and differs therefrom mainly in the location of the anchoring plate. The casing 25 is provided with a series of angularly spaced grooves 26 for accommodation of a bearing plate 27. The bearing plate 27 is secured to the anchoring plate 29 by means of shanks 30, 31 and 32 which may be integral with the anchoring plate 21 or which may be separate therefrom and extend therethrough. The outer ends of the shanks 30 and 31 may extend through the anchoring plate 20 and may be riveted over the same so as to hold the plates 27 and 29 in properly spaced relation.

A spring plate 33, identical to the spring plate 22, is secured to the bearing plate 27 by rivets or other suitable means extending through the apertures 22 and 23 or extending through similarly placed apertures. The shank 32 extends through a central aperture in the bearing plate 27 and in the spring plate 33 so as to also hold these elements in properly assembled relation.

Thus it will be seen that the various parts of the anchoring plate B are firmly connected together and are firmly anchored to the tire casing. The blades 22 and 33 preferably terminate somewhat inwardly of the bearing surface 12 of the tire casing 10 on the corresponding bearing surface 34 of the casing 25. As a result the blades 22 and 33 are normally spaced from the road or highway over which the vehicle is travelling. However, when the vehicle starts to skid to one side or to the other the tire twists or deflects in one direction or the other, rolling either the blades 22 or the similar blades 33 between the tire and the ground, thus preventing or decreasing the lateral skidding of the tire. The pressure upon the spring plates tends to flex the free ends thereof toward the casing rather than away from the same so that a lateral skidding action will not tend to tear the plates off from the casing, but cause them to dig into the surface and to prevent skidding.

In Figures 5 and 6 I disclose a modified form of construction C, which is designed for use in providing an easily removable type of non-skid plate. In the construction C, the casing 35 is provided with a series of multi-sided shanks 36 extending therethrough in angularly spaced relation. The shanks 36 are provided with heads 37 which lie inwardly of the inner casing surface to prevent the shanks from being pulled outwardly. The outer extremity of the shank 36 is of reduced diameter and is threaded as indicated at 38. A multi-sided plate 39 is threaded onto the threaded shank end 37, the member 39 being generally centered with respect to the shank portion 37. The multi-sided blade extends along the outer wall of the casing to terminate inwardly of the casing surface. As a result as the vehicle slides laterally the tire is distorted or rolled somewhat out of its normal position, flexing the plates 39 on one side of the casing into contact with the road or highway. This type of construction has the advantage that it may be rotated to some extent about its axis so as to bring different edges 40 thereof into engagement with the ground when others of the edges have become worn.

In accordance with the patent statutes, I have described the principles of construction and operation of my non-skid tire construction, and while I have endeavored to set forth the best embodiment thereof, I desire to have it understood that obvious changes may be made within the scope of the following claims without departing from the spirit of my invention.

I claim:

1. A vehicle tire including a ring shaped casing, notches in said casing in angularly spaced relation thereto, bearing plates located in said notches and secured to said casing and following the contour of the casing, and blades anchored to said bearing plates along the inner edge thereof and diverging outwardly toward the periphery of the casing, the outer edges of said last named blades being spaced from said bearing plates.

2. The construction described in claim 1 and including an anchoring plate embedded in the casing, and connecting means connecting said anchoring plate and said bearing plate.

3. The construction described in claim 1 and including an anchoring plate overlying the inner surface of the casing, and connecting means extending through the casing and through said bearing plate for connecting the anchoring plate and the bearing plate.

References Cited in the file of this patent

UNITED STATES PATENTS

| Number | Name | Date |
| --- | --- | --- |
| 1,278,605 | Davis | Sept. 10, 1918 |
| 1,335,916 | Poynter | Apr. 6, 1920 |
| 1,669,939 | Johnson | May 15, 1928 |
| 2,132,275 | Skelton | Oct. 4, 1938 |
| 2,178,592 | Lincoln | Nov. 7, 1939 |

FOREIGN PATENTS

| Number | Country | Date |
| --- | --- | --- |
| 1,459 | Great Britain | June 27, 1907 |
| 6,832 | Great Britain | 1907 |
| 11,801 | Great Britain | of 1911 |
| 26,343 | Great Britain | 1905 |